(12) United States Patent
Kurian et al.

(10) Patent No.: US 12,476,816 B2
(45) Date of Patent: Nov. 18, 2025

(54) QUANTUM-COMPATIBLE BLOCKCHAIN FOR ACCOUNTABILITY

(71) Applicant: Bank of America Corporation, Charlotte, NC (US)

(72) Inventors: Manu Kurian, Dallas, TX (US); Vinesh Patel, London (GB)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 18/510,792

(22) Filed: Nov. 16, 2023

(65) Prior Publication Data
US 2025/0168007 A1 May 22, 2025

(51) Int. Cl.
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 11,487,713 B1* | 11/2022 | Fisher | G06Q 50/26 |
| 11,632,238 B2 | 4/2023 | Miller et al. | |
| 11,669,351 B2 | 6/2023 | Simanovich et al. | |
| 2018/0276270 A1* | 9/2018 | Bisbee | G06Q 30/0241 |
| 2019/0372772 A1* | 12/2019 | Novotny | H04L 9/3239 |
| 2021/0227022 A1* | 7/2021 | Shrinivasan | H04L 9/0637 |
| 2022/0366088 A1* | 11/2022 | Grover | G06F 21/64 |
| 2023/0208640 A1* | 6/2023 | El Khiyaoui | H04L 9/3247 |
| | | | 713/168 |
| 2024/0048369 A1* | 2/2024 | Kam | H04L 9/3247 |
| 2024/0070234 A1* | 2/2024 | Wells | H04L 9/50 |
| 2024/0152934 A1* | 5/2024 | Otvos | G06Q 30/018 |
| 2024/0422010 A1* | 12/2024 | Tan | H04W 12/35 |

OTHER PUBLICATIONS

Allende et al., Quantum-resistance in blockchain networks, Apr. 6, 2023, Scientific Reports Nature Portfolio, 23 Total Pages (Year: 2023).*

(Continued)

*Primary Examiner* — Christopher C Harris
(74) *Attorney, Agent, or Firm* — Weiss & Arons LLP (57) ABSTRACT

Systems and methods may include contributing to a quantum-resistant blockchain that stores a quantum-resistant audit trail of changes to a dataset. A non-transitory computer readable medium may store instructions that are run on a computer processor to populate a block with a log of a dataset, run a quantum-resistant cryptographic algorithm to encrypt the block, distribute the block to and receive approval from blockchain nodes to add the block to the blockchain, and run the algorithm to encrypt the block onto the blockchain. The method may include repeating the steps of running the non-transitory medium on the computer processor to populate a second block with a second log of the dataset, run the algorithm to encrypt the second block, distribute the second block to and receive approval from the blockchain nodes to add the block to the blockchain, and run the algorithm to encrypt the second block onto the blockchain.

20 Claims, 4 Drawing Sheets

(56) References Cited

OTHER PUBLICATIONS

"Post Quantum Cryptography," European Union Agency for Cybersecurity, May 2021.
"NIST Announces First Four Quantum-Resistant Cryptographic Alogrithms," https://www.nist.gov/news-events/news/2022/07/nist-announces-first-four-quantum-resistant-cryptographic-algorithms, Jul. 5, 2022.

* cited by examiner

QUANTUM-COMPATIBLE BLOCKCHAIN FOR ACCOUNTABILITY

FIELD OF TECHNOLOGY

Aspects of the disclosure relate to quantum-resistant blockchains. Specifically, aspects of the disclosure relate to using quantum-resistant blockchains to store a quantum-resistant audit trail.

BACKGROUND OF THE DISCLOSURE

A substantial amount of research has been focused recently on quantum computers, which are machines that exploit quantum mechanical phenomena to solve mathematical problems that are difficult for conventional computers to solve. Quantum computers, once available, may compromise the security of many commonly used cryptographic algorithms.

Quantum computers may break many public-key cryptosystems that are used to implement digital signatures and key establishment. Quantum computers may also break many public-key cryptosystems that play a crucial role in ensuring the confidentiality and authenticity of communications on the internet and other networks.

Due to this concern, there may be a need for quantum-resistant cryptography. The goal may be to develop cryptographic algorithms that would be secure against both quantum and classical computers. These algorithms may serve as replacements for current public-key cryptosystems to prepare for the advent of large-scale quantum computing.

Implementing quantum cryptography in the present may have some advantages. First, the development of quantum computers may not proceed in a linear manner, so it may be unknown when quantum computing will become available to a large base of users. Second, it may be advantageous to migrate to quantum-resistant cryptography in advance of when quantum computers are built, so that any information that could later be compromised by quantum cryptanalysis would be more resistant to such future attacks. Therefore, it may be desirable to plan for this transition early.

SUMMARY OF THE DISCLOSURE

Provided are apparatus and methods for a quantum-resistant blockchain that stores a quantum-resistant audit trail of changes to a dataset. The quantum-resistant audit trail may provide accountability to changes in the dataset. The quantum-resistant audit trail may provide for maintaining accountability in world with quantum computing.

The method may include using a computer system for contributing to the quantum-resistant blockchain. The method may include storing a quantum-resistant audit trail of changes to the dataset.

The method may include using a computer processor to populate a block with a log of a version of the dataset.

The method may include using the computer processor to run a quantum-resistant cryptographic algorithm to encrypt the block with a hash.

The method may include using the computer processor to distribute the block to blockchain nodes.

The method may include receiving, at the computer processor, from the blockchain nodes, an approval to add the block to the quantum-resistant blockchain.

The method may include using the computer processor to run the quantum-resistant cryptographic algorithm to encrypt the block onto the quantum-resistant blockchain with a hash.

The method may include using the computer processor to populate a second block with a second log of a second version of the dataset.

The method may include using the computer processor to run the quantum-resistant cryptographic algorithm to encrypt the second block with a hash.

The method may include using the computer processor to distribute the second block to the blockchain nodes.

The method may include receiving, at the computer processor, from the blockchain nodes, an approval to add the second block to the quantum-resistant blockchain.

The method may include using the computer processor to run the quantum-resistant cryptographic algorithm to encrypt the second block onto the quantum-resistant blockchain with a hash.

The method may include using the computer processor to populate a third block with a third log of a third version of the dataset.

The method may include using the computer processor to run the quantum-resistant cryptographic algorithm to encrypt the third block with a hash.

The method may include using the computer processor to distribute the third block to the blockchain nodes.

The method may include receiving, at the computer processor, from the blockchain nodes, an approval to add the third block to the quantum-resistant blockchain.

The method may include using the computer processor to run the quantum-resistant cryptographic algorithm to encrypt the third block onto the quantum-resistant blockchain with a hash.

The method may include the first log of the first version of the dataset comprising an initial version of the dataset. The method may include the first block comprising an initial block in the quantum-resistant blockchain.

The method may include the first log of the first version of the dataset comprising changes between the first version of the dataset and a version of the dataset before the first version of the dataset. The changes may include a change to data, a change to metadata, or a change to data and metadata. The method may include the first block comprising a block in the quantum-resistant blockchain that, in addition to the first block, may include blocks before the first block in the quantum-resistant blockchain.

The method may include the first dataset, the second dataset, and the third dataset each including data at rest.

The method may include recording differences between the contents of the first dataset and the contents of the second dataset in the second log.

The method may include recording differences between the contents of the second dataset and the contents of the third dataset in the third log.

The method may include the quantum-resistant audit trail comprising a first log, second log, and a third log.

The method may include changes between versions of datasets may include a change to data, a change to metadata, or a change to data and metadata.

The method may include a dataset comprising a digital signature. The method may include changes to a dataset comprising introduction of the digital signature.

The method may include encrypting the digital signature with the quantum-resistant cryptographic algorithm. The quantum-resistant cryptographic algorithm may include a cryptographic suite for algebraic lattices (CRYSTALS)-Dilithium. The quantum-resistant cryptographic algorithm may include fast-fourier lattice-based compact signatures over N-th degree truncated polynomial ring units (NTRU) (FALCON). The quantum-resistant cryptographic algorithm may include a stateless hash-based signature scheme known as SPHINCS+. The quantum-resistant cryptographic algorithm may include a combination of two or three of CRYSTALS-Dilithium, FALCON, and SPHINCS+.

The quantum-resistant cryptographic algorithm may include two or more of the aforementioned, such as CRYSTALS-Dilithium, FALCON, and SPHINCS+.

The method may include locating the dataset on a secure website. The quantum-resistant cryptographic algorithm may include a cryptographic suite for algebraic lattices (CRYSTALS)-IND-CCA2-secure key encapsulation mechanism (KEM) (Kyber).

The method may include the dataset comprising a document.

The method may include the quantum-resistant blockchain comprising a distributed ledger. The method may include the quantum-resistant blockchain comprising an immutable ledger.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Provided are apparatus and methods for a quantum-resistant blockchain that stores a quantum-resistant audit trail of changes to a dataset. The apparatus may implement the methods. The quantum-resistant audit trail may provide accountability to changes in the dataset. The quantum-resistant audit trail may provide for maintaining accountability in a quantum computing world.

The apparatus may include a computer system for contributing to the quantum-resistant blockchain. The computer system may include a computer processor. The computer system may include a computer-readable medium that may be coupled with the computer processor. The computer-readable medium may include stored instructions. The stored instructions, when executed by the computer processor, may cause the computing system to perform a method. The method may include storing the quantum-resistant audit trail of changes to the dataset.

The method may include the quantum-resistant audit trail comprising a first log, second log, and a third log.

The method may include populating a first block that includes a first log of a first version of the dataset. The quantum-resistant audit trail may include the first log.

The first block may be encrypted with a hash using the quantum-resistant cryptographic algorithm.

The first log of the first version of the dataset may include an initial version of the dataset. The first block may be an initial block in the quantum-resistant blockchain.

The first log of the first version of the dataset may include changes between the first version of the dataset and a previous version of the dataset. The changes may be to data, metadata, or data and metadata. The first block includes a block in the quantum-resistant blockchain that may, in addition to the first block, second block, and third block, include blocks earlier in the quantum-resistant blockchain than the first block.

The dataset may include a document. The document may contain a digital signature. The dataset may memorialize a transaction.

The method may include using the computer processor to distribute the block to blockchain nodes.

The method may include receiving, at the computer processor, from the blockchain nodes, an approval to add the block to the quantum-resistant blockchain.

The method may include using the computer processor to run the quantum-resistant cryptographic algorithm to encrypt the block onto the quantum-resistant blockchain with a hash.

The quantum-resistant blockchain may be a distributed ledger. The distributed nature of the ledger across multiple nodes may make it difficult for a single entity to control the entire blockchain.

The quantum-resistant blockchain may be an immutable ledger. The immutable nature of the ledger may make it difficult to change the contents of a block that has been attached to the blockchain.

A quantum-resistant blockchain may be a blockchain resistant to compromise by a quantum computer or a conventional computer. The quantum-resistant blockchain may encrypt blocks making up the blockchain using the quantum-resistant cryptographic algorithm.

The quantum-resistant cryptographic algorithm for building the quantum-resistant blockchain may ensure security characteristics of the blockchain, even when faced with quantum computers. Quantum computers may efficiently break common current security techniques such as asymmetric encryption and digital signature algorithms based on number theory.

The quantum-resistant cryptographic algorithm may include post-quantum cryptography (PQC) that has been chosen for standardization by a standardization authority. The standardization authority may be the National Institute of Standards and Technology (NIST) in the United States. The standardization authority may be the European Union Agency for Cybersecurity (ENISA) in the European Union. The standardization authority in the European Union may include the European Committee for Standardization (CEN), the European Committee for Electrotechnical Standardization (CENELEC), and European Telecommunications Standards Institute (ETSI).

The quantum-resistant cryptographic algorithm may include an algorithm referred to as cryptographic suite for algebraic lattices (CRYSTALS). The quantum-resistant cryptographic algorithm may include an algorithm referred to as IND-CCA2-secure key encapsulation mechanism (KEM) that may be called Kyber. The quantum-resistant cryptographic algorithm may include an algorithm that includes both CRYSTALS and Kyber. This algorithm may be referred to as CRYSTALS-Kyber. CRYSTALS-Kyber may be used for general encryption. CRYSTALS-Kyber includes a public-key encapsulation mechanism (KEM) that may be standardized to provide general encryption. General encryption may include accessing secure websites. CRYSTALS-Kyber may be based on the computational hardness of problems involving structured lattices.

Advantages of CRYSTALS-Kyber may include comparatively small encryption keys compared to other quantum-resistant algorithms. Small encryption keys may facilitate easy exchange between two parties. Another advantage may include its speed of operation.

CRYSTALS-Kyber may be used for digital signatures.

The quantum-resistant cryptographic algorithm may include the CRYSTALS algorithm. The quantum-resistant cryptographic algorithm may include an algorithm referred to as Dilithium. The quantum-resistant cryptographic algorithm may include an algorithm that includes both CRYSTALS and Dilithium. This algorithm may be referred to as CRYSTALS-Dilithium. CRYSTALS-Dilithium may be used for digital signatures. Digital signatures may include digital signatures on electronic documents, purchase of products through the Internet, and the like. CRYSTALS-Dilithium may be based on the computational hardness of problems involving structured lattices.

Advantages of CRYSTALS-Dilithium may include a strongly secure digital signature scheme. Secure may refer to security from chosen message attacks based on the hardness of lattice problems over module lattices. CRYSTALS-Dilithium may include a higher efficiency than other quantum-resistant algorithms.

CRYSTALS-Dilithium may be used for general encryption.

The quantum-resistant cryptographic algorithm may include the fast-fourier lattice-based compact signatures over N-th degree truncated polynomial ring units (NTRU) algorithm. This may also be referred to as the FALCON algorithm. FALCON may be used for digital signatures. Digital signatures may include digital signatures on electronic documents, purchase of products through the Internet, and the like. FALCON may be based on the computational hardness of problems involving structured lattices.

Advantages of FALCON may include a strongly secure digital signature scheme. Security may result from a true Gaussian sampler that may be used internally, that may guarantee negligible leakage of information on the secret key up to a practically infinite number of signatures.

FALCON may also be compact. With the use of NTRU lattices, signatures may be substantially shorter than in any lattice-based signature scheme with the same security guarantees, while the public keys may be around the same size.

FALCON may also operate with speed. The use of fast Fourier sampling may allow for very fast implementations, such as thousands of signatures per second on a common computer, and verification may be five to ten times faster.

FALCON may also be scalable. Operations may have cost O (log n) for degree n, indicating that as input grows, the cost is not highly affected, allowing the use of very long-term security parameters at moderate cost.

FALCON may have RAM Economy. The enhanced key generation algorithm of Falcon may use less than 30 kilobytes of RAM, that may be a hundredfold improvement over previous designs such as NTRUSign. Falcon may be compatible with small, memory-constrained embedded devices.

FALCON may be used for general encryption.

The quantum-resistant cryptographic algorithm may include a stateless hash-based signature scheme known as SPHINCS+. The SPHINCS+ algorithm is read as "Sphincs plus." SPHINCS+ may be used for digital signatures. Digital signatures may include digital signatures on electronic documents, purchase of products through the Internet, and the like.

An advantage of SPHINCS+ includes that it may be an important backup to other quantum-resistant cryptographic algorithms as it is based on a different math approach than the other lead algorithms. SPHINCS+ operates using hash functions while other lead algorithms may operate with other strategies such as structured lattices.

SPHINCS+ may be used for general encryption.

The quantum-resistant cryptographic algorithm may include two or more of the aforementioned, such as CRYSTALS-Dilithium, FALCON, and SPHINCS+.

An additional quantum-resistant cryptographic algorithm may include Bit Flipping Key Encapsulation (BIKE). An additional quantum-resistant cryptographic algorithm may include Classic McEliece. An additional quantum-resistant cryptographic algorithm may include Hamming Quasi-Cyclic (HQC). An additional quantum-resistant cryptographic algorithm may include Supersingular isogeny Diffie-Hellman (SIDH).

The method may include generating a second log that may include changes between the first version of the dataset and the second version of the dataset. The changes may be to data in the dataset, metadata in the dataset, or data and metadata in the dataset. The quantum-resistant audit trail may include the second log.

The method may include using a computer processor to populate a second block with a second log. The second log may include a second version of the dataset.

The computer processor may use the quantum-resistant cryptographic algorithm to encrypt the second block with a hash.

The method may include using the computer processor to distribute the second block to blockchain nodes.

The method may include receiving, at the computer processor, from the blockchain nodes, approval to add the second block to the quantum-resistant blockchain.

The method may include using the computer processor to run the quantum-resistant cryptographic algorithm to encrypt the second block onto the quantum-resistant blockchain with a hash.

The method may include using a computer processor to populate a third block with a third log. The third log may include a third version of the dataset.

The computer processor may use the quantum-resistant cryptographic algorithm to encrypt the third block with a hash.

The method may include using the computer processor to distribute the third block to blockchain nodes.

The method may include receiving, at the computer processor, from the blockchain nodes, approval to add the third block to the quantum-resistant blockchain.

The method may include using the computer processor to run the quantum-resistant cryptographic algorithm to encrypt the third block onto the quantum-resistant blockchain with a hash.

The states of data may be a way of categorizing structured and unstructured data. The states of data may include data at rest, data in motion, and data in use. Data may change between states quickly, frequently, slowly, sporadically, systematically, or it may remain in a single state for the entire life cycle of a computer. The first dataset, the second dataset, and the third dataset may be in the same state of data, or in different states of data. The first dataset, the second dataset, and the third dataset may be in the same state of data, or in different states of data.

The method may include the quantum-resistant audit trail including a step-by-step record of changes to the dataset. The dataset may include an exchange of information between two parties. The dataset may include a document that has electronic signatures in it. The dataset may include a transaction between two parties including accounting transactions and trades in brokerage accounts. The process of following a quantum-resistant audit trail may facilitate tracing accounting, trade details, and other financial data to their source.

The method may include the quantum-resistant audit trail including a sequential record detailing the history and events related to a specific transaction or ledger entry. Blockchains may lend themselves as an effective tool for maintaining a quantum-resistant audit trail, as blockchains may also provide an effective way to keep a sequential record. Audit trails may be required by a regulatory office. Audit trails may provide a way of detecting fraud and investigating suspected fraud or illegal financial activity. Audit trails may provide confidence to the public about companies who provided certified or third party audit trails, as the public may be able to invest in the company more confidently. Audit trails may support a response to a regulatory authority who is making inquiries about a specific financial exchange, trade, or other exchange of data.

The method may include the quantum-resistant audit trail comprising data lineage. Data lineage may include the data origin, what happens to the data, and data movement over time. Data lineage may provide visibility and simplify tracing errors back to their root cause in a data analytics process. Data lineage may be stored on the quantum-resistant blockchain.

The method may include data lineage that may enable replaying specific portions or inputs of the blocks in the blockchain for stepwise debugging. The results of the method may include information that is called data provenance. The results may be used to address validation and debugging challenges. Data provenance may include records of the inputs, entities, systems, and processes that influence data of interest, providing a historical record of the data and its origins. The data provenance may include forensic activities such as data-dependency analysis, error/compromise detection and recovery, auditing, and compliance analysis.

Data analytics may include a systematic computational analysis of data or statistics. Data analytics may be used for the discovery, interpretation, and communication of meaningful patterns in data. Data analytics may also entail applying data patterns toward effective decision-making. Data analytics may be used by an organization to better understand business data and to improve their business performance. Data analytics may apply to a variety of fields such as marketing, management, finance, online systems, information security, and software services.

The method may include using the quantum-resistant cryptographic algorithm to make and populate blocks in a quantum-resistant blockchain. The quantum-resistant blockchain may assist the organization in maintaining the quantum-resistant audit trail of the dataset that may be immune to manipulation even after quantum computers become part of commerce.

The method may include the quantum-resistant blockchain that includes a public blockchain network. The public blockchain may include a decentralized peer-to-peer network. The public blockchain may allow anyone to join and participate.

The method may include the quantum-resistant blockchain that includes a private blockchain network. The private blockchain may include the decentralized peer-to-peer network. The private blockchain may be governed by one organization in the network. That organization may control who is allowed to participate, execute a consensus protocol, and maintain the shared ledger, that may each increase trust and confidence between participants. A private blockchain may be run behind a corporate firewall and may be hosted on the organization's premises.

A consensus protocol may include a program used in blockchain systems to achieve distributed agreement, trust, and security about the shared ledger's state. The consensus protocol may be implemented in a network with many processes and users. The consensus protocol may contribute to securing information, such as the dataset, by encrypting it and using automated group verification.

The method may include the quantum-resistant blockchain comprising a permissioned blockchain. The permissioned blockchain may include a private blockchain. The permissioned blockchain may include a public blockchain. The permissioned blockchain may place restrictions on who is allowed to participate in the blockchain network and for what type of datasets or transactions. Participants in the blockchain may need to obtain permission from the organization or members of the blockchain to join.

The method may include the quantum-resistant blockchain that includes a consortium blockchain. Multiple organizations may share the responsibilities of maintaining the blockchain. They may determine who may submit changes to the dataset, that may then trigger the creation of a block in the blockchain.

The method may include blockchain nodes that may build the quantum-resistant blockchain. Blockchain nodes may be moderators that build the infrastructure of a decentralized blockchain network. The blockchain nodes may maintain the public ledger's consensus, that varies according to the type of node. The architecture and design requirements of a particular blockchain protocol determine the types of blockchain nodes.

The method may include the quantum-resistant blockchain that may include steps taken to resist attack from fraudsters and hackers. The steps may include taking preventive measures from falling victim to a phishing attack.

The steps may include taking preventive measures from falling victim to a Sybil attack. In the Sybil attack, a hacker may create many false network identities to flood the network and crash the system.

The steps may include taking preventive measures from falling victim to a 51% attack. In the 51% attack, miners may obtain more than 50% of the blockchain network's mining power, that may allow them to have control over the ledge and may have an ability to manipulate it. A private blockchain may be invulnerable to the 51% attack.

The steps may include taking preventive measures from falling victim to a routing attack. In the routing attack, hackers may intercept data as it is transferring to an internet service provider. In the routing attack, a hacker may extract confidential data or currencies without a participant taking notice.

The method may include the first log of the first version of the dataset including an initial version of the dataset. The method may include the first block comprising an initial block in the quantum-resistant blockchain.

The method may include the first log of the first version of the dataset including changes between the first version of the dataset and a version of the dataset before the first version of the dataset. The changes may include a change to data, a change to metadata, or a change to data and metadata. The method may include the first block comprising a block in the quantum-resistant blockchain that, in addition to the first block, may include blocks before the first block in the quantum-resistant blockchain.

The method may include the first dataset, the second dataset, and the third dataset each including data at rest.

The method may include recording differences between the contents of the first dataset and the contents of the second dataset in the second log.

The method may include recording differences between the contents of the second dataset and the third dataset in the third log.

The method may include the quantum-resistant audit trail comprising the first log, the second log, and the third log.

The method may include changes between versions of datasets may include a change to data, a change to metadata, or a change to data and metadata.

The method may include the dataset comprising the digital signature. The method may include changes to the dataset, including introduction of the digital signature.

The method may include digital signature encrypting with the quantum-resistant cryptographic algorithm. the quantum-resistant cryptographic algorithm may include a cryptographic suite for algebraic lattices (CRYSTALS)-Dilithium. The quantum-resistant cryptographic algorithm may include fast-fourier lattice-based compact signatures over N-th degree truncated polynomial ring units (NTRU) (FALCON). The quantum-resistant cryptographic algorithm may include the stateless hash-based signature scheme known as SPHINCS+. The quantum-resistant cryptographic algorithm may include a combination of two or three of CRYSTALS-Dilithium, FALCON, and SPHINCS+.

The method may include the dataset located on a secure website. The quantum-resistant cryptographic algorithm may include the cryptographic suite for algebraic lattices (CRYSTALS)-IND-CCA2-secure key encapsulation mechanism (KEM) (Kyber).

The method may include the dataset comprising a document.

The method may include the quantum-resistant blockchain comprising a distributed ledger. The method may include the quantum-resistant blockchain comprising an immutable ledger.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
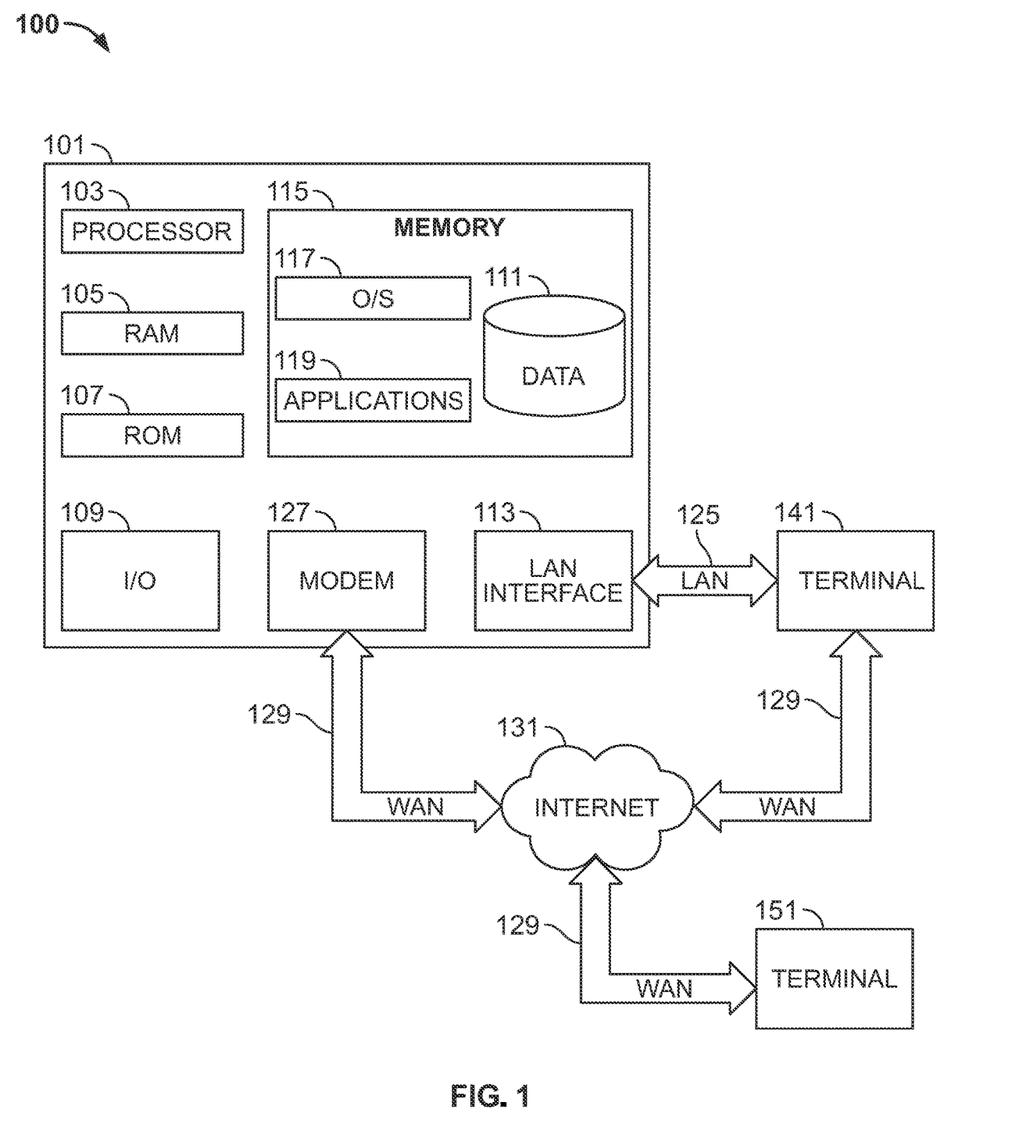
FIG. 1 shows an illustrative block diagram in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit (CPU), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as Graphics Processing Unit (GPU), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement data types. The invention may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. Differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
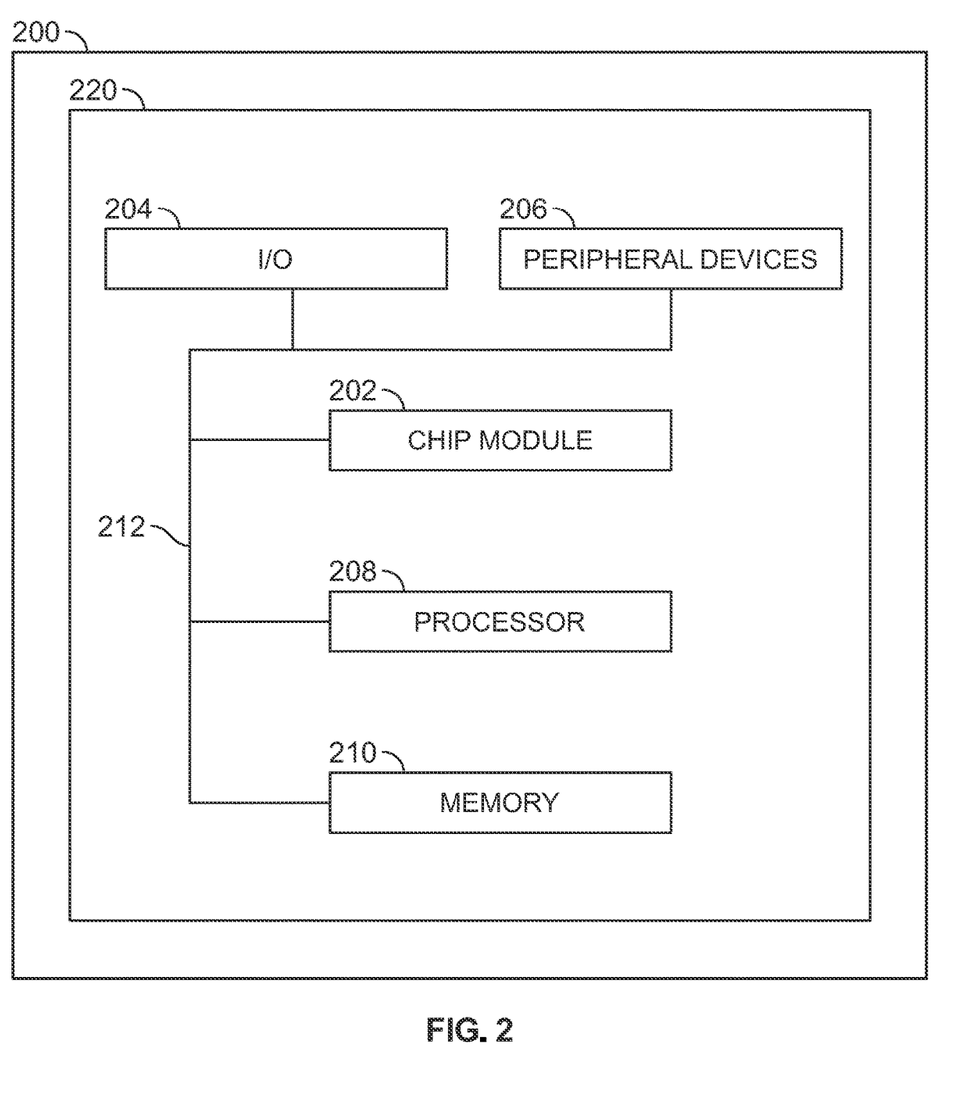
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, that may include one or more integrated circuits, and that may include logic configured to perform any other suitable logical operations.

Apparatus 200 may include one or more of the following components: I/O circuitry 204, that may include a transmitter device and a receiver device and may interface with fiber optic cable, coaxial cable, telephone lines, wireless devices, PHY layer hardware, a keypad/display control device or any other suitable media or devices; peripheral devices 206, that may include counter timers, real-time timers, power-on reset generators or any other suitable peripheral devices; logical processing device 208, that may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119 (shown in FIG. 1), signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
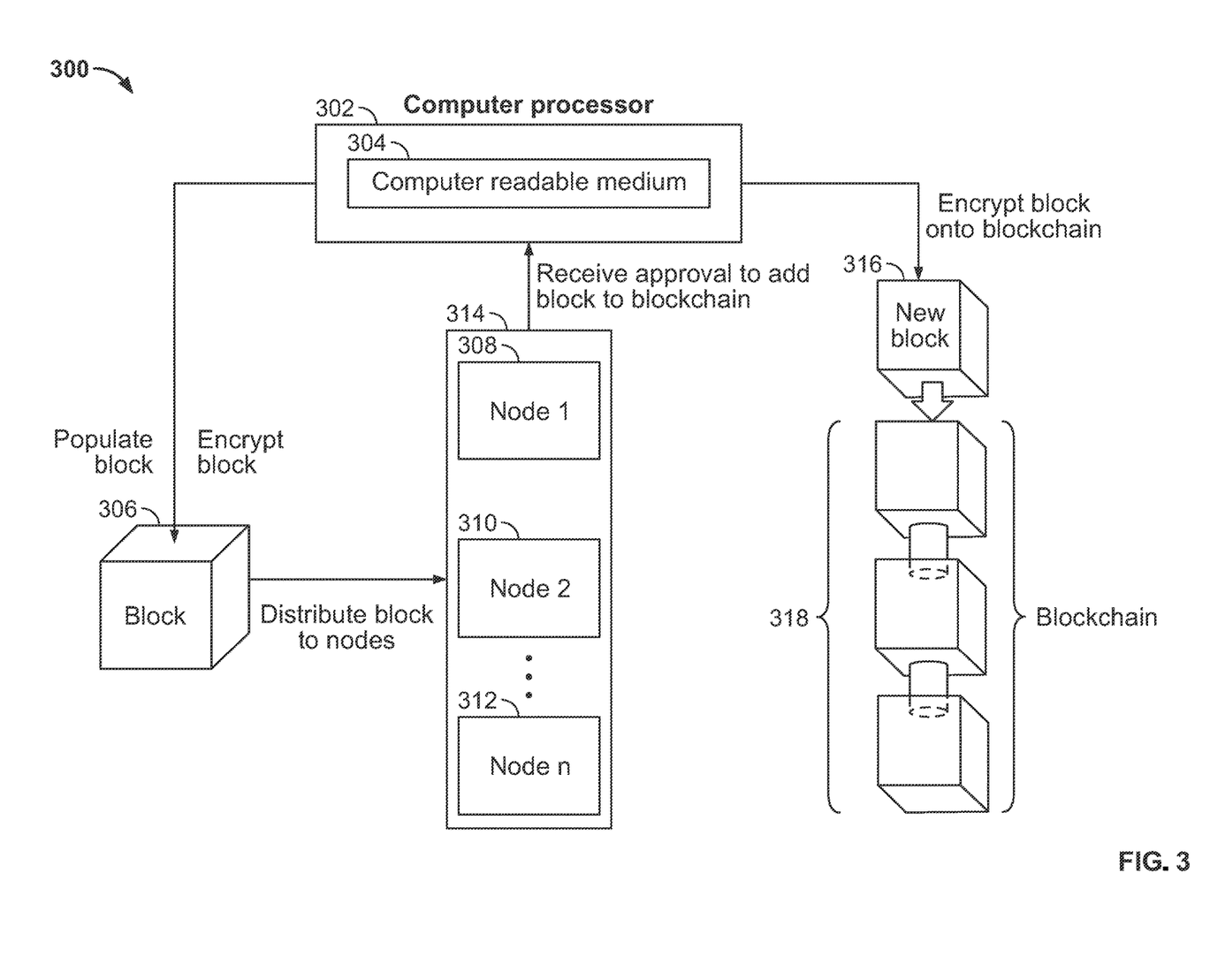
FIG. 3 shows an illustrative block diagram in accordance with principles of the disclosure.

FIG. 3 shows an illustrative diagram 300. Illustrative diagram 300 may show a quantum-resistant blockchain for maintaining a quantum-resistant audit trail.

Computer processor 302 may run a computer readable medium 304 to complete the task of adding blocks to a quantum-resistant blockchain to maintain a quantum-resistant audit trail.

Computer processor 302 may run the computer readable medium 304 to populate block 306. Computer processor 302 may run the computer readable medium 304 to encrypt block 306 as block 306 is populated. Block 306 may contain a log. The log may contain a version of the dataset. The log may contain changes made to the dataset compared to a version of the dataset when a previous block was added to the blockchain. Computer processor 302 may run the computer readable medium 304 to distribute block 306 to nodes 314.

Nodes 314 may include node 308, node 310, and node 312. The number of nodes may be 1 to 'n' nodes. Nodes 314 may grant approval to add block 306 to the quantum-resistant blockchain. Computer processor 302 may receive the approval from nodes 314.

Computer processor 302 may run the computer readable medium 304 to encrypt new block 316 on quantum-resistant blockchain 318. New block 316 may include block 306.

Figure 4:
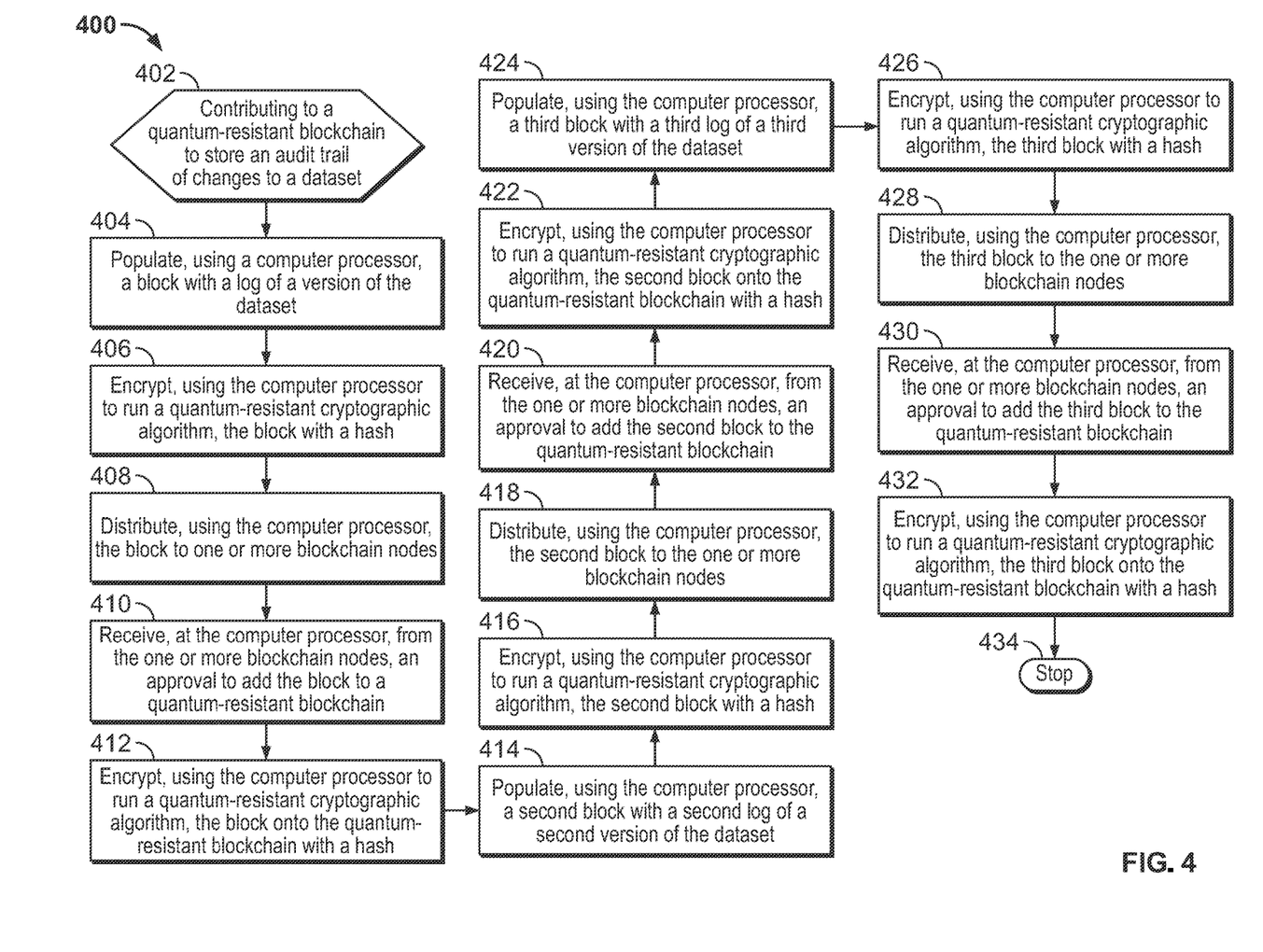
FIG. 4 shows an illustrative flowchart in accordance with principles of the disclosure.

FIG. 4 shows an illustrative flowchart 400. At step 402, start with contributing a quantum-resistant blockchain to store a quantum-resistant audit trail of changes to a dataset.

At step 404, a computer processor may populate a block with a log of a version of the dataset.

At step 406, the computer processor may run a quantum-resistant cryptographic algorithm to encrypt the block with a hash.

At step 408, the computer processor may distribute the block to one or more blockchain nodes.

At step 410, the computer processor may receive from the one or more blockchain nodes an approval to add the block to quantum-resistant blockchain.

At step 412, the computer processor may run the quantum-resistant cryptographic algorithm to encrypt the block onto the quantum-resistant blockchain with a hash.

The log of the version of the dataset may include an initial version of the dataset. The block is an initial block in the quantum-resistant blockchain.

The log of the version of the dataset may include one or more changes between the version of the dataset and a previous version of the dataset. The block may be a block in the quantum-resistant blockchain that includes one or more blocks earlier in the quantum-resistant blockchain than the block.

At step 414, the computer processor may populate a second block with a second log of a second version of the dataset.

At step 416, the computer processor may run the quantum-resistant cryptographic algorithm to encrypt the second block with a hash.

At step 418, the computer processor may distribute the second block to blockchain nodes.

At step 420, the computer processor may receive from the blockchain nodes an approval to add the second block to quantum-resistant blockchain.

At step 422, the computer processor may run the quantum-resistant cryptographic algorithm to encrypt the second block onto the quantum-resistant blockchain with a hash.

At step 424, the computer processor may populate a third block with a third log of a third version of the dataset.

At step 426, the computer processor may run the quantum-resistant cryptographic algorithm to encrypt the third block with a hash.

At step 428, the computer processor may distribute the third block to more blockchain nodes.

At step 430, the computer processor may receive from the blockchain nodes an approval to add the third block to quantum-resistant blockchain.

At step 432, the computer processor may run the quantum-resistant cryptographic algorithm to encrypt the third block onto the quantum-resistant blockchain with a hash.

The quantum-resistant audit trail may include the logs of the datasets. The datasets may each include data at rest. Differences between versions of the datasets may be noticeable when reviewing the logs.

At step 434, the method illustrated by the flowchart stops.

Thus, provided may be systems and methods for building the quantum-resistant blockchain that stores a quantum-resistant audit trail of changes to the dataset. Persons skilled in the art will appreciate that the present invention can be practiced by other than the described embodiments, that are presented for purposes of illustration rather than of limitation. The present invention is limited only by the claims that follow.

What is claimed is:

1. A computing system for contributing to a quantum-resistant blockchain that stores a quantum-resistant audit trail of changes to a dataset, comprising:
a computer processor; and
a computer-readable medium, coupled with the computer processor, having instructions stored thereon, that, when executed by the computer processor, cause the computing system to perform a method, the method comprising:
populating a first block with a first log of a first version of the dataset;
encrypting, using the computer processor to run a first quantum-resistant cryptographic algorithm, the first block with a hash, said first quantum-resistant cryptographic algorithm comprises cryptographic suite for algebraic lattices (CRYSTALS)-Kyber, CRYSTALS-Dilithium, fast-fourier lattice-based compact signatures over Nth degree truncated polynomial ring units (NTRU) (FALCON), a stateless hash-based signature scheme known as SPHINCS+, Bit Flipping Key Encapsulation (BIKE), Classic McEliece, Hamming Quasi-Cyclic (HQC), or Supersingular isogeny Diffie-Hellman (SIDH);
distributing, using the computer processor, the first block to one or more blockchain nodes;
receiving, at the computer processor, from the one or more blockchain nodes, approval to add the first block to the quantum-resistant blockchain;
encrypting, using the computer processor to run the first quantum-resistant cryptographic algorithm, the first block onto the quantum-resistant blockchain with a hash, said first quantum-resistant cryptographic algorithm comprises CRYSTALS-Kyber, CRYSTALS-Dilithium, FALCON, SPHINCS+, BIKE, Classic McEliece, HQC, or SIDH;
populating, using the computer processor, a second block with a second log of a second version of the dataset;
encrypting, using the computer processor to run a second quantum-resistant cryptographic algorithm, the second block with a hash, said second quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the second block to the one or more blockchain nodes;
receiving, at the computer processor, from the one or more blockchain nodes, approval to add the second block to the quantum-resistant blockchain;
encrypting, using the computer processor to run the second quantum-resistant cryptographic algorithm, the second block onto the quantum-resistant blockchain with a hash, said second quantum-resistant cryptographic algorithm comprises CRYSTALS-Kyber, CRYSTALS-Dilithium, FALCON, SPHINCS+, BIKE, Classic McEliece, HQC, or SIDH;
populating, using the computer processor, a third block with a third log of a third version of the dataset;
encrypting, using the computer processor to run a third quantum-resistant cryptographic algorithm, the third block with a hash, said third quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the third block to the one or more blockchain nodes;
receiving, at the computer processor, from the one or more blockchain nodes, approval to add the third block to the quantum-resistant blockchain; and encrypting, using the computer processor to run third quantum-resistant cryptographic algorithm, the third block onto the quantum-resistant blockchain with a hash, said third quantum-resistant cryptographic algorithm comprises CRYSTALS-Kyber, CRYSTALS-Dilithium, FALCON, SPHINCS+, BIKE, Classic McEliece, HQC, or SIDH;

wherein:
the first log of the first version of the dataset comprises an initial version of the dataset and the first block comprises an initial block in the quantum-resistant blockchain; or the first log of the first version of the dataset comprises one or more changes between the first version of the dataset and a version of the dataset before the first version of the dataset and the first block comprises a block in the quantum-resistant blockchain that, in addition to the first block, second block, and third block, comprises one or more blocks before the first block;

the first version of the dataset, the second version of the dataset, and the third version of the dataset each comprise data at rest;

differences between contents of the first version of the dataset and contents of the second version of the dataset are recorded in the second log;

differences between contents of the second version of the dataset and contents of the third version of the dataset are recorded in the third log;

the quantum-resistant audit trail comprises the first log, the second log, and the third log;

said second version of the dataset is a more recent in time than the first version of the dataset;

said third version of the dataset is a more recent in time than the second version of the dataset; and the first quantum-resistant cryptographic algorithm, the second quantum-resistant cryptographic algorithm, and the third quantum-resistant cryptographic algorithm comprise at least two different quantum-resistant cryptographic algorithms.

2. The computer system of claim 1, wherein the first version of the dataset comprises data and metadata.

3. The computer system of claim 1, wherein:
the first log of the first version of the dataset comprises one or more changes between the first version of the dataset, and a version of the dataset before the first version of the dataset;
the one or more changes comprise changes to data, metadata, or data and metadata; and
the first block comprises a block in the quantum-resistant blockchain that, in addition to the first block, second block, and third block, comprises one or more blocks before the first block.

4. The computer system of claim 1, wherein:
the first log of the first version of the dataset comprises an initial version of the dataset;
the initial version of the dataset comprises data and metadata; and
the first block comprises an initial block in the quantum-resistant blockchain.

5. The computer system of claim 1, wherein the third version of the dataset contains a digital signature.

6. The computer system of claim 5, wherein the third quantum-resistant cryptographic algorithm comprises cryptographic suite for algebraic lattices (CRYSTALS)-Dilithium, fast-fourier lattice-based compact signatures over Nth degree truncated polynomial ring units (NTRU) (FALCON), a stateless hash-based signature scheme known as SPHINCS+, or combinations thereof.

7. The computer system of claim 1, wherein the third version of the dataset is located on a secure website.

8. The computer system of claim 7, wherein the third quantum-resistant cryptographic algorithm comprises cryptographic suite for algebraic lattices (CRYSTALS)-IND-CCA2-secure key encapsulation mechanism (KEM) (Kyber).

9. The computer system of claim 1, wherein the first version of the dataset, the second version of the dataset, and the third version of the dataset are documents.

10. The computer system of claim 1, wherein the quantum-resistant blockchain comprises a distributed ledger.

11. A non-transitory computer readable medium storing instructions for contributing to a quantum-resistant blockchain that stores a quantum-resistant audit trail of changes to a dataset, when the instructions are executed by a computing system, cause the computing system to perform a method, the method comprising:
populating a first block with a first log of a first version of the dataset;
encrypting, using a computer processor to run a first quantum-resistant cryptographic algorithm, the first block with a hash, said first quantum-resistant cryptographic algorithm comprises cryptographic suite for algebraic lattices (CRYSTALS)-Kyber, CRYSTALS-Dilithium, fast-fourier lattice-based compact signatures over Nth degree truncated polynomial ring units (NTRU) (FALCON), a stateless hash-based signature scheme known as SPHINCS+, Bit Flipping Key Encapsulation (BIKE), Classic McEliece, Hamming Quasi-Cyclic (HQC), or Supersingular isogeny Diffie-Hellman (SIDH);
distributing, using the computer processor, the first block to one or more blockchain nodes;
receiving, at the computer processor, from the one or more blockchain nodes, approval to add the first block to the quantum-resistant blockchain;
encrypting, using the computer processor to run the first quantum-resistant cryptographic algorithm, the first block onto the quantum-resistant blockchain with a hash, said first quantum-resistant cryptographic algorithm comprises CRYSTALS-Kyber, CRYSTALS-Dilithium, FALCON, SPHINCS+, BIKE, Classic McEliece, HQC, or SIDH;
populating, using the computer processor, a second block with a second log of a second version of the dataset;
encrypting, using the computer processor to run a second quantum-resistant cryptographic algorithm, the second block with a hash, said second quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the second block to the one or more blockchain nodes;
receiving, at the computer processor, from the one or more blockchain nodes, approval to add the second block to the quantum-resistant blockchain;
encrypting, using the computer processor to run the second quantum-resistant cryptographic algorithm, the second block onto the quantum-resistant blockchain with a hash, said second quantum-resistant cryptographic algorithm comprises CRYSTALS-Kyber, CRYSTALS-Dilithium, FALCON, SPHINCS+, BIKE, Classic McEliece, HQC, or SIDH;

populating, using the computer processor, a third block with a third log of a third version of the dataset;
encrypting, using the computer processor to run a third quantum-resistant cryptographic algorithm, the third block with a hash, said third quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the third block to the one or more blockchain nodes;
receiving, at the computer processor, from the one or more blockchain nodes, approval to add the third block to the quantum-resistant blockchain; and
encrypting, using the computer processor to run third quantum-resistant cryptographic algorithm, the third block onto the quantum-resistant blockchain with a hash, said third quantum-resistant cryptographic algorithm comprises CRYSTALS-Kyber, CRYSTALS-Dilithium, FALCON, SPHINCS+, BIKE, Classic McEliece, HQC, or SIDH;
wherein:
the first log of the first version of the dataset comprises an initial version of the dataset and the first block comprises an initial block in the quantum-resistant blockchain; or the first log of the first version of the dataset comprises one or more changes between the first version of the dataset and a version of the dataset before the first version of the dataset and the first block comprises a block in the quantum-resistant blockchain that, in addition to the first block, second block, and third block, comprises one or more blocks before the first block in the quantum-resistant blockchain;
the first version of the dataset, the second version of the dataset, and the third version of the dataset each comprise data at rest;
differences between contents of the first version of the dataset and contents of the second version of the dataset are recorded in the second log;
differences between contents of the second version of the dataset and contents of the third version of the dataset are recorded in the third log; and
the quantum-resistant audit trail comprises the first log, the second log, and the third log;
said third version of the dataset is a more recent in time than the second version of the dataset; and
the first quantum-resistant cryptographic algorithm, the second quantum-resistant cryptographic algorithm, and the third quantum-resistant cryptographic algorithm comprise at least two different quantum-resistant cryptographic algorithms.

12. A method for contributing to a quantum-resistant blockchain to store a quantum-resistant audit trail of changes to a dataset, the method comprising:
populating, using a computer processor, a first block with a first log of a first version of the dataset;
encrypting, using the computer processor to run a first quantum-resistant cryptographic algorithm, the first block with a hash, said first quantum-resistant cryptographic algorithm comprises cryptographic suite for algebraic lattices (CRYSTALS)-Kyber, CRYSTALS-Dilithium, fast-fourier lattice-based compact signatures over Nth degree truncated polynomial ring units (NTRU) (FALCON), a stateless hash-based signature scheme known as SPHINCS+, Bit Flipping Key Encapsulation (BIKE), Classic McEliece, Hamming Quasi-Cyclic (HQC), or Supersingular isogeny Diffie-Hellman (SIDH);
distributing, using the computer processor, the first block to one or more blockchain nodes;
receiving, at the computer processor, from the one or more blockchain nodes, approval to add the first block to the quantum-resistant blockchain;
encrypting, using the computer processor to run the first quantum-resistant cryptographic algorithm, the first block onto the quantum-resistant blockchain with a hash, said first quantum-resistant cryptographic algorithm comprises CRYSTALS-Kyber, CRYSTALS-Dilithium, FALCON, SPHINCS+, BIKE, Classic McEliece, HQC, or SIDH;
populating, using the computer processor, a second block with a second log of a second version of the dataset;
encrypting, using the computer processor to run a second quantum-resistant cryptographic algorithm, the second block with a hash, said second quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the second block to the one or more blockchain nodes;
receiving, at the computer processor, from the one or more blockchain nodes, approval to add the second block to the quantum-resistant blockchain;
encrypting, using the computer processor to run the second quantum-resistant cryptographic algorithm, the second block onto the quantum-resistant blockchain with a hash, said second quantum-resistant cryptographic algorithm comprises CRYSTALS-Kyber, CRYSTALS-Dilithium, FALCON, SPHINCS+, BIKE, Classic McEliece, HQC, or SIDH;
populating, using the computer processor, a third block with a third log of a third version of the dataset;
encrypting, using the computer processor to run a third quantum-resistant cryptographic algorithm, the third block with a hash, said third quantum-resistant cryptographic algorithm comprises CRYSTALS-Kyber, CRYSTALS-Dilithium, FALCON, SPHINCS+, BIKE, Classic McEliece, HQC, or SIDH;
distributing, using the computer processor, the third block to the one or more blockchain nodes;
receiving, at the computer processor, from the one or more blockchain nodes, approval to add the third block to the quantum-resistant blockchain; and
encrypting, using the computer processor to run third quantum-resistant cryptographic algorithm, the third block onto the quantum-resistant blockchain with a hash, said third quantum-resistant cryptographic algorithm comprises CRYSTALS-Kyber, CRYSTALS-Dilithium, FALCON, SPHINCS+, BIKE, Classic McEliece, HQC, or SIDH;
wherein:
the first log of the first version of the dataset comprises an initial version of the dataset and the first block comprises an initial block in the quantum-resistant blockchain; or the first log of the first version of the dataset comprises one or more changes between the first version of the dataset and a version of the dataset before the first version of the dataset and the first block comprises a block in the quantum-resistant blockchain that, in addition to the first block, second block, and third block, comprises one or more blocks before the first block in the quantum-resistant blockchain;

the first version of the dataset, the second version of the dataset, and the third version of the dataset each comprise data at rest;

differences between contents of the first version of the dataset and contents of the second version of the dataset are recorded in the second log;

differences between contents of the second version of the dataset and contents of the third version of the dataset are recorded in the third log;

the quantum-resistant audit trail comprises the first log, the second log, and the third log;

said second version of the dataset is a more recent in time than the first version of the dataset;

said third version of the dataset is a more recent in time than the second version of the dataset; and the first quantum-resistant cryptographic algorithm, the second quantum-resistant cryptographic algorithm, and the third quantum-resistant cryptographic algorithm comprise at least two different quantum-resistant cryptographic algorithms.

13. The method of claim 12, wherein:

the first log of the first version of the dataset comprises one or more changes between the first version of the dataset, and a version of the dataset before the first version of the dataset;

the one or more changes comprise change to data, metadata, or data and metadata; and the first block comprises a block in the quantum-resistant blockchain that, in addition to the first block, second block, and third block, comprises one or more blocks before the first block.

14. The method of claim 12, wherein:

the first log of the first version of the dataset comprises an initial version of the dataset;

the initial version of the dataset comprises data and metadata; and the first block is an initial block in the quantum-resistant blockchain.

15. The method of claim 12, wherein the third version of the dataset contains a digital signature.

16. The method of claim 15, wherein the third quantum-resistant cryptographic algorithm is cryptographic suite for algebraic lattices (CRYSTALS)-Dilithium, fast-fourier lattice-based compact signatures over Nth degree truncated polynomial ring units (NTRU) (FALCON), a stateless hash-based signature scheme known as SPHINCS+, or combinations thereof.

17. The method of claim 12, wherein the third version of the dataset is located on a secure website.

18. The method of claim 17, wherein the third quantum-resistant cryptographic algorithm is cryptographic suite for algebraic lattices (CRYSTALS)-IND-CCA2-secure key encapsulation mechanism (KEM) (Kyber).

19. The method of claim 12, wherein the first version of the dataset, the second version of the dataset, and the third version of the dataset are documents.

20. The method of claim 12, wherein the quantum-resistant blockchain comprises an immutable ledger.

* * * * *